No. 628,284. Patented July 4, 1899.
G. J. QUINSLER & G. W. McNEAR.
RUBBER TIRE FOR CARRIAGE WHEELS.
(Application filed Oct. 28, 1898.)
(No Model.)
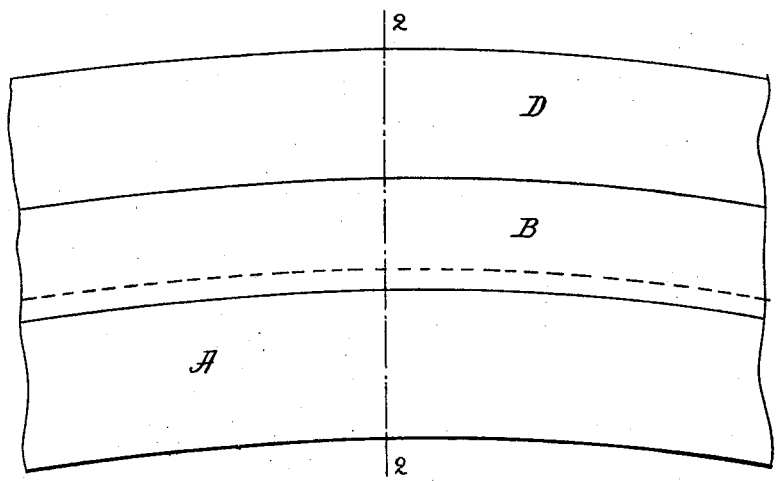
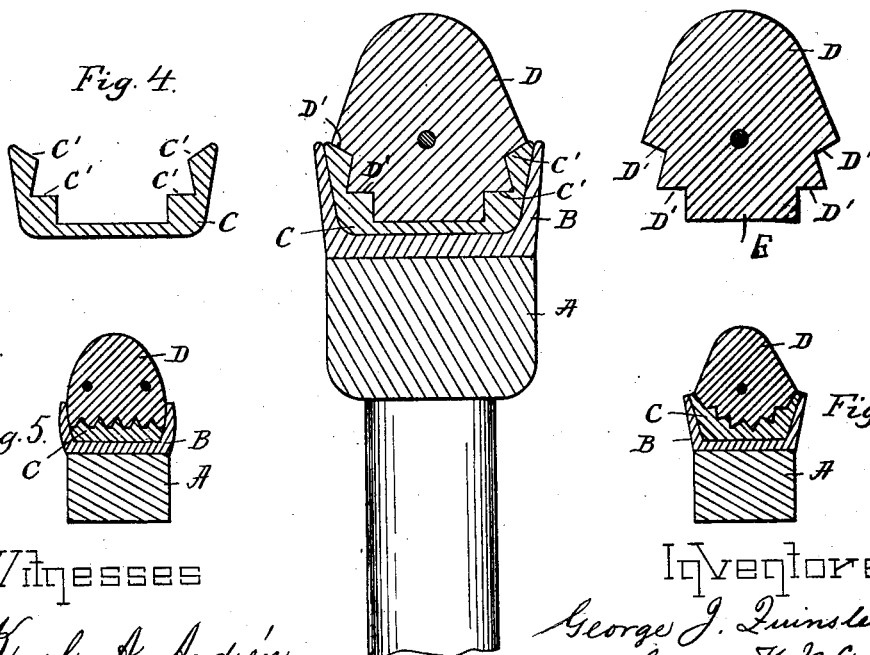
Witnesses
Karl A. Andrén
Charles A. Harris
Inventors
George J. Quinsler
and George W. McNear
by Alban Andrén their atty.

UNITED STATES PATENT OFFICE.

GEORGE J. QUINSLER, OF BROOKLINE, AND GEORGE W. McNEAR, OF AUBURNDALE, MASSACHUSETTS.

RUBBER TIRE FOR CARRIAGE-WHEELS.

SPECIFICATION forming part of Letters Patent No. 628,284, dated July 4, 1899.

Application filed October 28, 1898. Serial No. 694,816. (No model.)

*To all whom it may concern:*

Be it known that we, GEORGE J. QUINSLER, residing at Brookline, in the county of Norfolk, and GEORGE W. McNEAR, residing at Auburndale, in the county of Middlesex, State of Massachusetts, citizens of the United States, have invented new and useful Improvements in Rubber Tires for Carriage-Wheels, of which the following is a specification.

This invention relates to improvements in rubber tires for carriage-wheels; and it has for its object to more firmly secure the tire in its elastic base portion, thus preventing it from moving or slipping out of its true position relative to the wheel, and for this purpose our invention is carried out as follows, reference being had to the accompanying drawings, wherein—

Figure 1 represents a side elevation of the invention. Fig. 2 represents a cross-section on the line 2 2 shown in Fig. 1. Fig. 3 represents a cross-section of the rubber tire. Fig. 4 represents a cross-section of the annular elastic base in which the rubber tire is received.

Similar letters refer to similar parts wherever they occur on the different parts of the drawings.

In the drawings, A represents the felly of a carriage-wheel as usual, and to the periphery of the same is secured in any well-known manner the ⌊▁⌋-shaped steel channel B, as shown.

C is the annular elastic base-ring, supported in the steel channel B. As shown, said base-ring is trough-shaped in cross-section, having a flat smooth bottom and provided upon its sides with a plurality of annular steps or shoulders C' C'.

The letter D indicates the elastic tire, having a convex tread or periphery, as usual, and formed on its inner circumference with a flat smooth tongue or rib E, that rests on the flat smooth bottom of the trough or channel in the base-ring. The sides of that part of the tire that rest in the base-ring are provided with annular steps or shoulders D' D', that rest on the corresponding steps or shoulders C' C' of the base-ring. By this construction of the tire and base-ring the parts are caused to be held in contact with each other without liability of the tire being twisted or moved sidewise out of true alinement with the wheel. Moreover, the flat smooth surface of the inner circumference of the tire is given a firm flat bearing by the correspondingly-formed bottom of the trough or channel of the base-ring. The life or durability of the wheel is thus lengthened or increased.

What we wish to secure by Letters Patent and claim is—

1. In a wheel-tire, the combination with the metallic channeled rim, of an elastic annular base-ring fitted in said rim and having a peripheral trough-shaped channel provided upon its sides with annular steps or shoulders, and a rubber tire fitted in the base-ring and provided upon its inner sides with annular steps or shoulders resting and supported on the corresponding steps or shoulders of the base-ring, substantially as described.

2. In a wheel-tire, the combination with the metallic channeled rim, of an elastic annular base-ring fitted in said rim and having a peripheral trough-shaped channel, said channel having a flat smooth bottom and stepped or shouldered sides, and a rubber tire fitted in the base-ring and provided upon its inner circumference with a flat smooth tongue or rib arranged to rest upon the flat smooth bottom of the base-ring and upon its inner sides with steps or shoulders resting or supported on the corresponding steps or shoulders of the base-ring, substantially as described.

In testimony whereof we have hereunto set our hands in presence of two subscribing witnesses.

GEORGE J. QUINSLER.
GEORGE W. McNEAR.

Witnesses:
EDWARD W. NEWTON,
THOMAS L. CUNARD.